April 19, 1966   G. D. RHOADS ETAL   3,246,369
MOLD FOR FLUID SEAL

Original Filed March 9, 1964   3 Sheets-Sheet 1

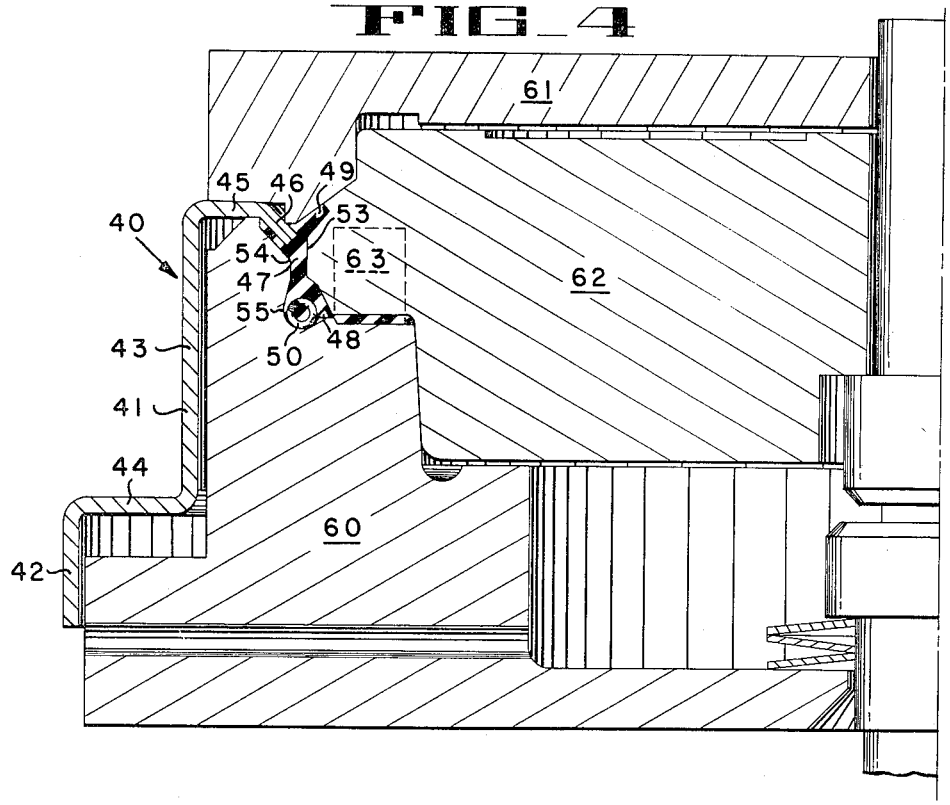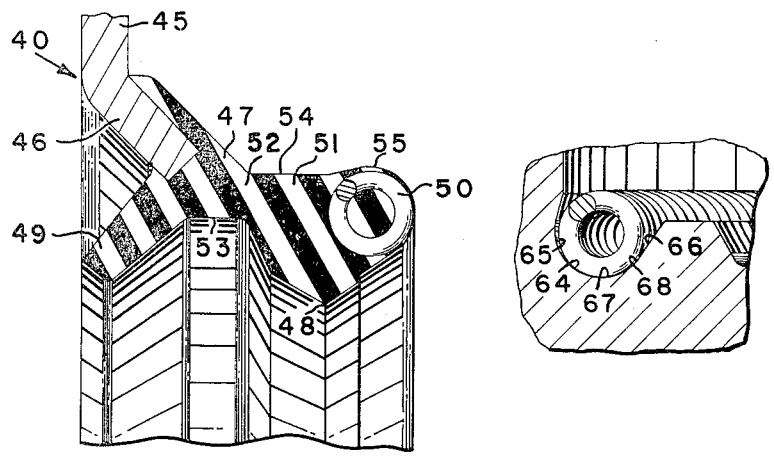

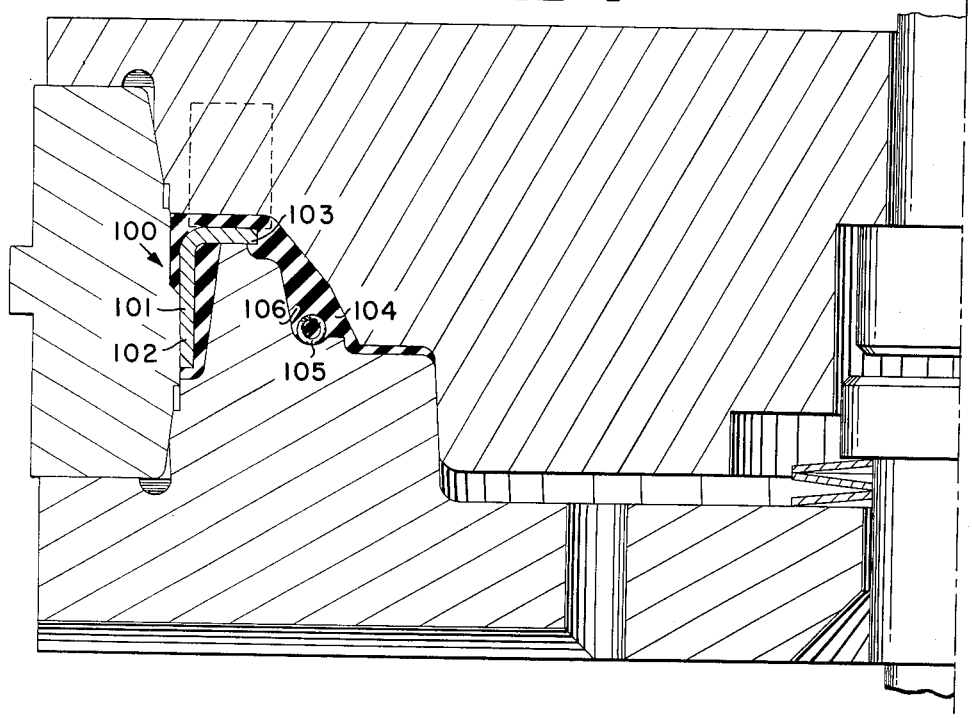
FIG_7
FIG_9
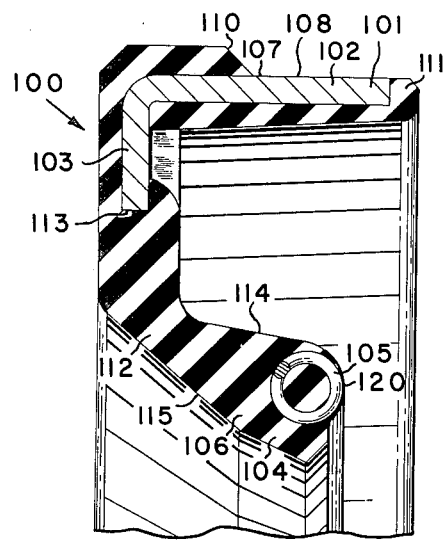
FIG_8
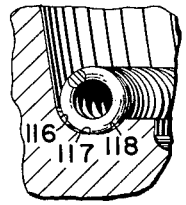

3,246,369
MOLD FOR FLUID SEAL
George D. Rhoads, Redwood City, and Vasalie L. Peickii, Hillsborough, Calif., assignors to Federal-Mogul Corporation, a corporation of Michigan
Original application Mar. 9, 1964, Ser. No. 351,278. Divided and this application Mar. 15, 1965, Ser. No. 443,762
9 Claims. (Cl. 18—36)

This application is a division of application Serial No. 351,278, filed March 9, 1964, which was a continuation-in-part of application Serial No. 138,073 filed September 14, 1961, now abandoned.

This invention relates to a mold for making an improved lip-type radial shaft seal of the type characterized by having a garter spring molded directly into the body of elastomeric material forming the sealing lip.

Ever since spring-loaded elastomeric shaft-sealing elements have been manufactured there has been a problem of spring retention. Most elastomeric sealing members are molded to provide a groove to receive the garter spring; some seals use metal case members instead of or in addition to such grooves to keep the spring in position. However, springs retained by these prior art methods have quite often become displaced during shipment or installation of the seals with the result that they do not exert the necessary pressure on the lip, or do so unevenly, and in either event the seal fails. Furthermore, springs that have been displaced during installation or afterwards, have often become entangled in gears and bearings, causing serious damage.

The problem has been particularly difficult with roll neck seals used in steel rolling mills where large-diameter seals are involved and where the seals have been installed by slamming them in place with a sledge hammer. The installations have been very hard on the seals, and the sharp blows have often knocked out the springs, although the person installing the seal usually did not know that the spring had been knocked out, or did not look to see. As a result, the lip was often not retained in contact with the shaft, and there was then severe leakage. In addition, the springs sometimes got into the gears and bearings and caused very serious damage. In one instance the misplacing of a spring in just this situation cost $30,000 to repair the bearings. Springs are also misplaced during installation of the heavy seal housing (called "chock" in steel mills) over the end of the shaft or roll neck. This type of installation occurs as often as once each four hours when the rolls are reground. Chocks weigh up to 70 tons and often displace springs during the crane-type installation required for the great weight involved. In the present invention, relative displacement between the spring and the sealing lip cannot occur because the spring is molded directly into the body of the oil seal, just back of the sealing lip.

Another problem is somewhat less obvious than that of spring retention. Recently, automobile manufacturers and others have demanded far closer tolerances in oil seal dimensions than manufacturers have been able to achieve consistently in seals of conventional structure. When a seal has been molded, it is usually trimmed to its finished size by a knife. The trouble has been that the body of the sealing lip has been so flexible, especially when it is recessed by a spring-receiving groove, that during trimming its tendency to yield or flex tends to produce variations in the size and concentricity of the part, and molding tolerances result in exaggerated trim tolerances.

The present invention provides a sealing element body that is directly reinforced and stiffened by a spring that is molded into the body. This spring controls the stiffness of the material and makes the trimming action far more exact. Close-wound springs molded into the body also prevent shrinkage of the elastomer after molding, another variable feature, for the fully collapsed metal spring prevents the elastomer from shrinking. Moreover, the molded-in spring causes the sealing lip to exert a more uniform force on the shaft.

Accurate concentricity is also important in order to obtain even wear on the shaft, and this is true in all applications where there is high wear, especially in such applications as in steel rolling mills where the roll necks have rather rough surfaces and where uneven pressures give particularly bad effects. It is important to get uniform compressive force on the shaft to obtain good sealing performance, and it is important to get even wear in order that the seal may have long life. Such uniformity and accuracy is provided by the seal of this invention.

Many seals need a relatively thin cross-section in order to provide enough flexibility to follow the shaft runout, and the present invention makes possible the smaller cross-sections which impart this flexibility.

Also, shaft seals have a problem with dissipating the frictional heat caused by the lip rubbing on the shaft. The thicker the seal cross-section, the more difficulty there is in dissipating the heat, because the elastomer is a poor conductor of heat. The present invention embeds a metal spring in the elastomer, and this embedded metal member conducts heat much better and dissipates it by being exposed or practically exposed along a portion of its surface to the atmosphere, or to the lubricant being sealed.

Another problem is that of pressure. When there is a pressure differential on the opposite side of the seal, due to pressure on the lubricant side, the pressure on the lip tends to cause the lip to sag and to wear over a wide area. It also tends to push the lip groove in away from the spring after the spring reaches its fully closed position. The present invention, by molding the elastomer to the spring, reinforces the lip portion and prevents sagging; it also prevents separation of the lip from the spring. The support reduces wear and frictional heat and extends the seal life and performance under these pressure conditions, which occur in many applications.

There are problems in making shaft seals with springs embedded in the sealing lip body during molding. Before the present invention, attempts to do it were not commercially feasible because the flow of rubber into the mold tended to force the spring out of position and mislocate it in the elastomer. When attempts were made to keep the spring in position by means of chaplets in the mold, the resulting sealing element had areas bare of rubber where the chaplets were in contact with the spring. These areas were so located that oil could then leak past the seal by going through these bare areas.

The prior art contains pictures and descriptions of oil seals with a spring embedded in and said to be molded into the elastomeric sealing lip. However, this art does not appear to have been practical commercially, and the disclosures do not tell how to make the product in such a way that the needed uniformity is obtained. There are three important considerations: namely, (1) positive and accurate location of the spring *radially* in reference to the contact point of the lip, in order to maintain a uniform rubber thickness between the lip edge and the spring, (2) accurate axial location for the spring during molding, to locate the spring accurately in the axial direction in relation to the sealing lip, and (3) mechanically preventing the spring from being forced out of round into waves or ripples during molding, due to the pressure of the elastomer against unsupported spring portions.

For example, some prior art publications show springs completely embedded in elastomer in a way in which it is apparent there could be no control in the mold over any of these three factors; no positive radial location, no positive axial location, and no prevention of uneven deformation by elastomer flow. Other publications show structures in which the spring may appear to have some support but in which the support is non-uniform or discontinuous. Experience has shown that, with this discontinuous support in the mold, the unsupported portions deform and, as a result, after the molding is finished the spring seeks to resume its original shape and produces a wavy sealing element.

The present invention solves this manufacturing problem by providing a novel mold in which the seal is molded upside down, compared to normal molds. Gravity, rubber flow, spring pressure, and other forces present during molding are all employed to retain the spring in the correct position, rather than moving it out of position. Moreover, the present invention provides continuous support completely around the spring to give positive location within a small range of tolerances for both the radial and axial location of the spring in the sealing lip, and also for prevention of out-of-roundness, rippling or waviness, by combining these supports with a particular relationship to the elastomer flow. These very important elements have made it possible to provide a spring embedded in the lip portion of the oil seal, while at the same time obtaining the necessary accuracy and uniformity in a degree which could not be attained heretofore, so far as is known.

Difficulty has also been encountered when an incorporated spring tended to make certain sealing elements too inflexible so that they were unable to follow shaft runout and had a very high torque loss resulting in a short seal life. Thick head sections and thick flex sections contributed to this inflexibility as did the fact, discovered in the course of making this invention, that in small-diameter seals when the spring was embedded in the elastomer and the elastomer became bonded to the spring, this took most of the yielding action out of the spring. The spring loops could open only with difficulty, for the metal could not move relative to the elastomer, and the elastomer had to move with the metal. For some types of applications this relative rigidity is a good thing, and in some forms of the present invention, positive bonding is purposely resorted to, in accordance with the principles of the invention. However, in other instances, this bonding is not desirable and is to be avoided. The present invention makes it possible to avoid this bonding while at the same time not creating other troubles.

For example, it might be thought that bonding could be avoided by applying a conventional bond release agent to the spring. However, when this was done without further steps being takens, there were problems in obtaining good seals. The present invention enables a correction of this difficulty. The invention also enables better bonding of the spring to the elastomer, when that is desirable.

One further problem should be mentioned. The cost of seals having springs embedded directly in the rubber has heretofore been very high. This high cost was due to the difficulty of getting the spring located properly in the mold, to the number of rejects obtained, to the necessity of using several steps in place of a single unitary method. The present invention has enabled this cost to be greatly reduced and therefore makes such seals quite practical.

In the course of solving the above problems, many other advantages and features of the invention were presented, and the following description discusses them as well as other objects of the invention that can best be understood when there has been a more detailed description of the invention.

In the drawings:

FIG. 4 is a fragmentary view in elevation and in section of part of a mold embodying a modified form of the invention for making a somewhat different seal structure.

FIG. 5 is an enlarged fragmentary view of a portion of the mold of FIG. 4.

FIG. 6 is an enlarged fragmentary view in elevation and in section of the lip portion of the seal made from the mold of FIG. 4.

FIG. 7 is a view similar to FIG. 4 of another modified form of mold for making a somewhat different type of seal embodying the principles of this invention.

FIG. 8 is an enlarged fragmentary view of a portion of the mold of FIG. 7.

FIG. 9 is an enlarged view in elevation and in section of the trimmed seal made from the mold of FIG. 7.

Figure 1:
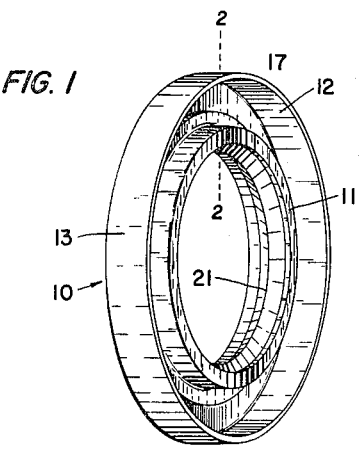
FIG. 1 is a view in perspective of a radial shaft seal embodying the principles of the invention.
Figure 2:
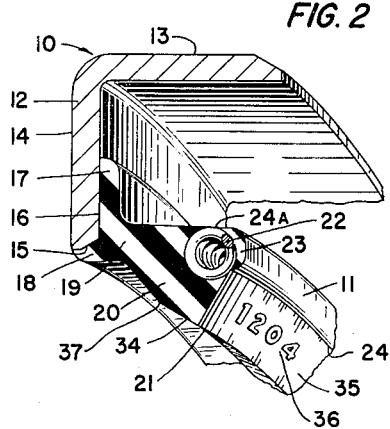
FIG. 2 is a fragmentary enlarged view in section taken along the line 2—2 in FIG. 1.

Like many radial-type shaft seals, the seal 10 of this invention has an elastomeric element 11 bonded to a rigid case member 12 of steel or other suitable material. The seal case 12 is normally provided with a cylindrical portion 13 and a radial flange 14 to which the resilient sealing element 11 is bonded.

A novel feature of this seal is that the inner peripheral edge 15 of the radial flange 14 is preferably ground or otherwise shaped along an angle of about 15° to 45° to afford a superior anchoring edge for the elastomeric sealing element 11. The element 11 is bonded to the inner face 16 of the radial flange 14 and to the inclined edge 15 by respective portions 17 and 18. The angle of the edge 15, opening up toward the element 11, gives a thicker and stronger portion 18 less likely to break off than a thin straight portion would be.

The element 11 has a flex section 19 and an enlarged head or body portion 20. The portion 20 is provided with a sharp lip 21 and includes a molded-in helical garter spring 22, preferably close-wound. Beside the spring 22 there may be a cover portion 23, but there need be no applicable rubber at points 24 and 24a.

In order to obtain a light sealing pressure, it is often desirable for the spring 22 *not* to be bonded to the elastomeric body 20. For this purpose, the spring 22 is preferably coated (before being inserted in the mold) with a suitable mold release agent such as a silicone mold release fluid like a dilute water solution of Aquarex "L." If this mold release material were simply applied to the spring 22 and the spring 22 placed in the mold, the mold release material would also tend to prevent the elastomer from bonding to the metal case 12, apparently due to flow of the mold release material through the elastomer during the molding operation. We have found, however, that by evaporating the mold release material in a separate oven drying process before inserting the spring 22 into the mold, it is possible to prevent bonding of the rubber to the spring, while at the same time not contaminating any other part of the mold or having any adverse effect on the finished product. Alternatively or additionally, the spring 22 may be given a controlled surface finish such as a mechanical polish, or the rubber compound in the head 20 may be a type such as some nitrile compounds which tend not to bond to the steel of the spring 22. The provision of means enabling relative movement between the spring wire and the elastomer; i.e., that there be no bonding, is significant. Laboratory tests have shown, for example, that in one particular relatively small diameter seal, the addition of a mold release agent alone to an untreated spring that was later embodied in a standard compound, tripled the life of the seal.

When the spring wire can move relatively to the rubber body 20 it can act much like the typical groove-retained oil seal garter spring. When it cannot do so, because of bonding, it loses most of its ability to act like a spring in smaller-sized shaft seals. This in itself may, in some instances, be quite useful where great rigidity is desired, and in larger sizes of shaft seals. Therefore, the invention is not limited to instances where bonding is undesirable, although it does provides a positive means of preventing bonding which does have important consequence in many applications. However, where increased rigidity is desirable, as for example where it is desired to prevent the seal lip from being urged in too far by pressure conditions, the use of the completely closed loop coiled spring bonded firmly to the rubber prevents the elastomer from being urged in even by pressure of the fluid which is being sealed, and therefore in those instances bonding can act to preserve and extend the life of the seal. When this is desirable, a suitable bonding cement is applied to the spring before it is placed in the mold.

Another novel feature of the invention is that the spring 22, whether close-wound or open-wound is in its relaxed compressed position as molded and before the seal 10 is installed, and is expanded in operation the same amount as the sealing lip 21 is expanded by shaft interference. Most often, the close-wound spring 22 is more desirable because more control can be obtained over it, for it has been found that close-wound springs are more readily retained in proper position in the mold free from distortion by the elastomer. Moreover, as said above, these close-wound springs can be used not only to provide the desired lip pressure on the shaft, but also to limit the amount of inward movement of the seal lips toward the shaft center, and this is of great value in installations where the material being sealed tends to exert pressure causing undue lip wear.

A further important feature of the invention is that the seal head or body 20 is smaller than it could be if an exterior garter spring were to be used. As a result, much less rubber, usually at least 30% less, is consumed in making the seal. Furthermore, this enables a spring-in-rubber seal to attain the desired flexibility herebefore lacking. The mass of the head section 20 is preferably no larger than is necessary to cover a spring 22 of the smallest size that will exert the necessary tension for a given shaft size, plus sufficient rubber to make sure that the spring does not wear through the body 20 into the shaft.

By holding the mass of the head section 20 small, the initial compressive force exerted by the seal on the shaft is much smaller than where the head section has a larger mass. This reduction in compressive force is significant, for excessive compressive force means high torque loss and the generation of heat. In the seal 10, the total initial force is composed of (1) the practically constant force exerted by the spring 22 when the sealing lip 21 is stretched by installation on the shaft, and (2) the additional force caused by stretching the synthetic elastomer in the head section 20. This additional force is highest when the seal 10 is new and tapers off to nothing after a short period of use, during which the elastomer may take a permanent set.

Another important feature of maintaining the mass of the head section 20 small by use of the spring incorporated into the elastomer is in the matter of dissipation of the heat of friction generated by the relative movement of the lip and the shaft. Since the elastomer is a poor conductor of heat, the larger the head section the more the heat tends to build up, and it can be quite destructive to the seal. Furthermore, by having the lip section relatively small and by having the spring much closer to the actual sealing contact portion of the lip than is possible where the spring is retained loosely in a groove, additional rapid dissipation of the heat is obtained. This keeps the lip contact area temperature low. This is the area most likely to fail due to excessive heat. The steel of the spring is many times as good a conductor of heat as is the elastomer, and since the outer portions of the spring are exposed, this heat can be dissipated in the fluid being sealed, or in the ambient atmosphere much more readily and much more quickly than it can where all the heat passes through the elastomer before reaching the spring. It may be noted in this connection that the small amount of tight flash covering the spring and resulting from mold tolerances has no considerable amount of insulating power, whereas the deep embedding of such a spring would prevent proper heat dissipation. It should also be noted that even though only a small proportion of the spring is exposed to the fluid being sealed, still that can dissipate the heat much better than can a completely unexposed or more heavily covered spring. The groove which is present in typical oil seals obviously cannot be made too deep without providing a very weak head section, which tends to break, tends to be damaged during trimming of the seal, and tends to make accurate manufacture impossible; whereas, by embedding the spring in the head section, these difficulties are overcome and the spring can be quite close to the lip relative to what it could be in the free-spring-type of structure.

Figure 3:
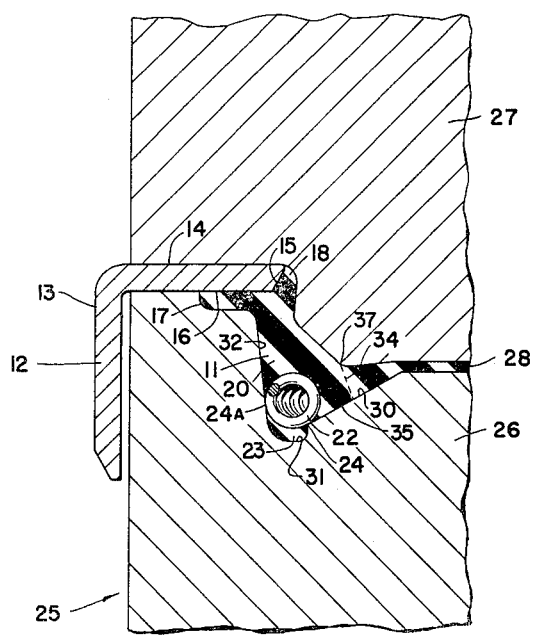
FIG. 3 is an enlarged fragmentary view in elevation and in section of a portion of a mold in which the seal of FIG. 1 is molded, showing the molded seal in the mold.

A typical molding operation is illustrated in FIG. 3, which shows a portion of the mold 25 in which the seal 10 is made. A lower mold section 26 and an upper mold section 27 engage opposite sides of the case's radial flange 14 and confine the elastomer in the cavity between them. When, as shown, the lip 21 is made by later trimming, the sealing member 11 as molded has a hat 28, the trimming being done later along the line 29. The lower mold portion 26 has a conical portion 30, against which the spring 22 is seated, and a groove portion 31 at the lower end of the portion 30 and smaller in diameter than the spring coils, to provide the elastomeric cover portion 23 for the spring 22. This cover 23 can, however, be omitted if desierd. The spring 22 also engages a nearly vertical wall 32 of the mold portion 26.

As compared with conventional manufacture, the seal 10 is molded upside down so that gravity can assist in holding the spring 22 in the proper position. The spring 22 can be dropped into the mold, and gravity causes it to rest against the parts 30 and 32. The spring 22 cannot expand beyond the wall 32 because the wall 32 holds it, and its own tension acts to counteract such an expansive force anyway. Note that the outer periphery of the spring 22 coming into contact with the mold at the point 24a acts to positively limit the radial position of the spring in the head section, since the spring cannot move inwardly against the outward flow of the elastomer. The synthetic elastomer in this mold flows downwardly and somewhat outwardly thereby tending to equalize the spring 22 around the wall 30. The spring 22 also does not move radially inwardly because there is no tension on the spring 22; it is in its smallest or rest position. Any tendency of outside forces to displace the spring radially inwardly is offset by the fact that to be so displaced the spring 22 would have to move against both gravity and the flow of elastomer into the mold 25. Axial positioning is obtained by the two points 24 and 24a against which the spring comes to rest in this form of the invention, by which the spring is retained, and against which it is forced by the flow of elastomer, giving positive positioning of the spring except for small tolerances in the mold. Thus, both radial and axial positioning of the seal are obtained with the resultant important advantages and the resultant accuracy. Furthermore, the spring is continuously supported in both these radial and axial positions rather than being intermittently supported. Hence, the roundness of the spring is retained by this continual support on the radially inner side, so that the spring cannot buckle or ripple at these points. This roundness is assured partly by the conical surface 30 on which the spring rests and along which it is moved down by the elastomer flow. Since this surface is itself round, and since the spring also engages the opposite wall 24a, substantially perfect roundness of the spring is obtained even though the spring may have been somewhat egg-shaped when placed in the mold.

As a result, the spring 22 is accurately located in the body 20 during the molding operation, and concentricity with the mold 25 is assured, in turn assuring concentricity with the outer periphery 13 and with the inner edge 15 of the case 12.

As mentioned earlier, the presence of the spring 22, and the fact that it is centered in the member 11 greatly aids trimming, making trimming a far more precise operation than it was with conventional oil seals. One interesting feature of the seal is that the sealing surface 34 of the lip is the trimmed surface, while the exclusion surface 35 is a molded surface, due to the use of the wall 30 in locating the spring 22. This has some advantages, because the molded surface 35 is smoother than a trimmed surface and is therefore a better excluding surface, while the machined or ground surface 34 is a better oil-retaining surface because of the slight roughness introduced by machining or grinding, and has superior dry-running properties. Furthermore, it becomes possible to mold the name and part number on a portion 36 of the molded surface 25. However, these advantages should not obscure the very important gain in manufacturing precision which the molded-in spring 22 gives, making it possible to achieve significant improvement in tolerances.

Rigidity imparted to the body 20 by the spring 22 is not the only reason that tolerances are improved in this invention. On a conventional seal with a molded spring groove, the tolerances of the inner diameter of the spring groove, the spring dimensions and tensions, and the resisting force in the rubber must all be taken into consideration as well as the tolerance of the trim inner diameter. Consequently, the resultant tolerances of the inner periphery are only about one-fourth of what they are in conventional seals, even aside from the rigidity feature.

The invention thus provides a seal 10 in which it is impossible to displace the spring 22 during shipment, installation or operation of the seal 10. No second metal case is needed to protect or help hold the spring on the sealing member, as with prior art spring-loaded seals. The spring 22 is accurately located at all times, and its pressure on the lip 21 is uniform, so that the lip 21 exerts a more uniform pressure on the shaft. The rubber completely encircles the spring 22, filling in the space where the spring ends are joined together, as well as any irregularities of the spring 22; the elastomer may fill the spring itself, or it may not, depending upon molding conditions; in any event the spring 22 is protected from corrosion and it cannot be compacted by dirt in severe operating conditions where heretofore spring-loaded oil seals have had trouble.

There is more accurate control of concentricity between the inner periphery of the sealing member 11 and the outer periphery 13 of the case 12, because the sealing member 11 may be trimmed by locating the periphery 13 in a collett, after which there are no additional operations that could change the concentricity between the inner periphery 21 and the outer periphery 13.

Another very important feature of this invention not mentioned heretofore is that seals made by this invention can have smaller spring-loaded cross-sections. This is due to the fact that the spring 22 is located much closer to the lip 21 than it could be in a groove-types spring-retention seal. For it is necessary to maintain sufficient cross-section to support a spring in a groove, whereas in this invention there can be bare metal at the points 24 and 24a where the spring 22 touches the mold 25, without in the least interfering with the operation of the seal. This becomes very important in very large-diameter oil seals as well as in very small ones. In very small ones it is apparent that space is at a premium, but in very large ones that space between the shaft and the bore is much smaller relative to the shaft diameter than in even very small seals. Moreover, very large seals (e.g., twelve to fifty inches in diameter) often require more inherent ruggedness, since they are used in environments that are more severe. These advantages enable the seal of this invention to go along with the trend of a reduction in size and weight of all machine parts.

Seals made according to this invention also have better runout capabilities for a seal of a given height, because the spring-retaining lip on the groove has been eliminated. This feature, too, is quite important for it enables a sealing element of small cross-sectional height to accommodate more shaft eccentricity than could be done formerly.

Since the molded spring groove with its overall radii and small cross-sections has been eliminated, the mold cavity is easier to fill and there are fewer rejects in producing the seal of this invention than in producing seals with spring grooves. Considerably less rubber compound is required per seal because of the smaller total cross-section and because part of that cross-section is taken up by the spring metal. About 30 percent less elastomer is required than is needed in making conventional seals. Both these factors contribute handsomely to a reduction in production costs.

Fewer molds are required because fewer standard sealing member heights are necessary in order to accommodate the maximum anticipated shaft runout for various shaft sizes. The molds themselves, having fewer intricacies such as are caused by spring-retaining grooves, are easier to chrome plate.

The presence of the spring 22 in the molded body 20 has the important effect of eliminating the necessity of allowing for shrinkage of the elastomer, because the metal prevents shrinkages. The spring 22 being in its relaxed position cannot shrink; when close-wound coils are used there is no place for the metal to go. For this reason, synthetic elastomers having different shrinkage factors may all be used in the same mold, whereas formerly they often required different solds.

For the same basic reason the dimensions of the seal of this invention are easier to check than those of prior art seals, because the spring 22 holds the sealing element 11 in place.

Again for the same reason, the trim operation itself is facilitated. The increase in rigidity is due to the fact that the elastomer has forces of shrinkage while the spring prevents the shrinkage. Thus it is easier to control the trim inner diameter and the concentricity of the lip 21 relative to the shell 13. The direction of the trim operation is reversed; the trim knife starts at the sealing lip 21 and finishes at point 37 on the sealing surface heel. This procedure eliminates break-through burrs and feather edges on the lip 21, putting them on the uncritical edge 37. It thus solves an important quality-control problem. Moreover, the inner diameter of the assembled seal cannot change from that of the sealing member after trim since there is no installation of a spring after trim as there was in the prior art seals. Therefore, one inspection operation is eliminated.

The sealing element 11 need not necessarily be bonded to its case, so far as this invention is concerned, though that does give definite advantages. But the spring in and unbonded to the rubber body can be used in clamped constructions such as that of U.S. Patent 2,626,169 if desired. Also, the lip 21 may be molded to shape or made otherwise than by trim, though once more the advantages of the trim process are lost thereby.

FIG. 6 shows a modified form of seal 40 made according to the principles of the invention, and FIGS. 4 and 5 show a modified form of mold for making this seal 40. These further illustrate the principles of the invention and show some of the variations which are possible.

In this instance, a seal 40 is to be molded with a stepped metal case 41 having cylindrical portions 42 and 43 connected by a radial stepped portion 44; the case 41 also has a radial flange 45 with a terminal portion 46 that is bent into that position during molding in accordance with the principles of U.S. Patent 3,004,298. To this terminal portion is bonded an elastomeric sealing element 47 having two lips 48 and 49, the lip 48 being a main sealing lip which is to be spring-urged by a spring 50 that is bonded into the seal lip body 51, while the lip 49 is a dust-excluding lip that does not require any spring.

This dual-lip seal 40 is very desirable on many occasions but it presents a special difficulty, especially when it is to be made with a molded-in spring 50, in that there must be a thin flex section 52 to enable the main sealing lip 48 to flex enough to follow the runout of the shaft. Yet, it is obvious that this flex section cannot entirely be provided by relief on the sealing-lip side of the body 51. In other words, the recessed portion 53 in between the lips 48 and 49 cannot be made too deep, otherwise the seal 40 cannot be taken out of the mold. In this invention the difficulty is solved by making that portion 53 well within the limits enabling good removal from the mold and by providing a relief 54 on the other side of the lip body 51 so that the body 51 has an outwardly extending portion 55 in which the spring 50 is embedded, and is quite thin at the flex section 52.

As shown in FIG. 4, the principles of molding already discussed are again applied. In this instance the mold is made in three sections comprising a lower ring 60, an upper member 61, and a core member 62. The core 62 and upper member 61 cooperate to provide the dust sealing lip 49 along an as molded shape, and the core 62 provides the inner recessed portion 53 between the lips 48 and 49. The lower ring 60 and the core 62 cooperate to shape the main lip 48, while a closed stroke of the mold is assured by the upper mold member 61. The elastomer is inserted in the mold in the form of a prepared ring 63, usually of rectangular cross-section and known as "prep," placed in the position indicated by the broken lines in FIG. 4. It will be apparent that the elastomer flow during closure of the mold is downward and outward, and this flow is utilized in the spring retention in the mold as will be seen.

A spring-retaining cavity 64 is provided having a concave shape somewhat greater in radius than the largest spring which is to be used in the mold accommodating for all tolerances. As a result, the spring 50 has a certain amount of movement possible in the mold, but this is narrowly limited within the tolerance ranges of the springs being used, and there is still, in substance, the positive support in all three ways which were noted earlier in connection with the mold of FIG. 3. It will be apparent from the drawing that outward expansion of the spring can occur only within narrow limits due to contact of the spring 50 with the cavity wall at a point 65, which stops further radially outward movement, that inner movement, of the spring 50 would have to be opposite to the flow of the elastomer and therefore will not occur, and that inner support is obtained against buckling by elastomer which has gotten to the opposite side of the spring 50 by means by the positive support at a point 66. Furthermore, axial alignment of the spring 50 is provided by the fact that the elastomer is flowing axially in a direction to force the spring 50 against a point 67, which therefore retains the spring in that direction. All these "points" 65, 66, and 67 are, of course, really circles when considering the entire annular seal 40. As a result, the spring 50 is located radially in reference to the contact point of the lip 48 and thereby maintained at a uniform elastomer thickness between the spring 50 and the lip edge 48, thereby enabling even wear on the shaft and increasing the life of the seal, and providing for the uniform pressure or compressive force which is needed to assure good sealing performance. At the same time, the positive axial location provided for the spring 50 during molding causes the spring 50 to be accurately held, and the correct axial position in relation to the sealing lip 48 is obtained. Both these positions are obtained by continuous support around the full periphery of the seal ring. Moreover, the continuous support along the line 67 indicated by the point which is on the surface 68 of a relatively steep angle that is, for example, perhaps 30° to 45°, prevents buckling, rippling and waving of the spring 50 during molding. Such motion is mechanically prevented, and therefore internal collapse of any portion of the spring 50 is prevented. The location is high enough to round the spring 50 out, even though the spring 50 upon insertion may be somewhat ovoid. This rounding out takes place when the spring 50 is dropped into the mold under the spring's own weight or gravity. It is enforced by the flow of elastomer which comes from a direction which enables better centering rather than being destructive of the centering.

FIGS. 7-9 show another modified form of the invention. In this particular instance a seal 100 has a case 101 with a cylindrical portion 102 and a short radial portion 103 which does not extend in too close to a lip 104, this becoming possible because of the use of the rigidity imparted by a spring 105 embedded in the rubber body 106. For maximum spring retention, the spring 105 is usually bonded in, in this application. The elastomer body 106 is bonded to the case 101, and there may tight flash 107 along the exposed case outer periphery 108. There is a tapered portion 110 enabling entry, and a rubber-covered toe portion 111 at the entry side also, the rubber covering of most of the seal case preventing corrosion as well as accommodating insertion in rather rough bores.

The elastomer body 106 is shaped to provide a flex section 112 somewhat distant from the lip 104 and also from the radially inner end 113 of the radial portion 103 of the case 101. This is useful in seals that are subject to rough handling during insertion, as in roll neck seals, to prevent damage at the point where the inner radial extremity 113 of the case might in the other constructions be relatively exposed.

In this instance, the flex section 112 is obtained by the converging of the opposite faces 114 and 115 of the lip body 106 toward the radially extending portion 103, and for this purpose there is no need to actually have an outer periphery extend radially inwardly from the spring, there being more room available in this particular instance. However, there are again three support portions 116, 117 and 118, as discussed before, to assure radial positioning of the spring positively in the mold proper and positive positioning in an axial direction, and continuous support on the inner periphery of the spring 105 which assures that the spring 105 will be round.

In installation, the seal 100 may have the heavy oil or grease on the normal side immediately next to the exposed portion 120 of the spring 105, or where dirt exclusion is more important the seal may be turned around, or the seals may be used in pairs.

It will thus be apparent that this invention provides an apparatus for molding a helical garter spring into a continuous elastomeric body while assuring positive location of the spring in that body and while assuring full roundness of the spring. By inserting the spring in a mold cavity having a dead-end trap with converging walls, inserting a prepared ring of elastomer in the mold, and molding the elastomer under pressure, during closure of the mold the flow of the elastomer pushes said spring into contact with the walls of the trap and conforms the spring, within narrow limits, between two circles lying on the opposite sides of the spring coils, the trap walls converge toward a dead end on the opposite side of the spring from that from which the elastomer is flowing.

To those skilled in the art to which this invention relates, many additional changes in construction and widely differing embodiments of the invention will suggest themselves without departing from the spirit and scope of the invention as defined in the claims.

What is claimed is:

1. A mold for making a metal-reinforced elastomeric oil seal of the type having a sealing lip with a garter spring molded into the lip body, comprising means providing a mold cavity for shaping said lip, having a spring-receiving portion with converging walls providing a first surface for initial support of a looped said spring, which acts to shape it into a circle, and a surface radially outwardly spaced from said first surface limiting radial outward movement of said spring to prevent substantial stretch, said surfaces meeting at a dead end, said spring receiving portion providing means for limiting axially outward movement of said spring, and means for causing the elastomer to flow in a direction tending to move said spring toward said dead end during the molding operation and for causing said spring to engage at least one said wall adjacent said dead end at a seat, said mold having a parting line for escape of gases closely adjacent said dead end, extending generally radially inwardly from the radially inner of said converging walls at an end of said wall, said parting line lying at a distance from said seat smaller than the coil diameter of said spring.

2. A mold for making a metal-reinforced elastomeric oil seal of the type having a sealing lip with a garter spring molded into the lip body, comprising means providing a mold cavity shaping said lip body, said cavity having a spring-receiving portion with a first wall providing a sloping flaring surface on which a looped said spring can be placed and which acts to form said spring to a circular shape, means for flowing elastomer in a direction tending to move said spring along said wall in a direction tending to stretch the spring while said wall keeps it round, a second wall radially outwardly spaced from said first wall and limiting radial outward movement of said spring to prevent substantial stretch, and a third wall for limiting axially outward movement of said spring, said three walls meeting along an arc having a radius only slightly greater than the coil radius of said spring, sufficient for tolerance in the sizes thereof said spring seating along said arc, said mold having a parting line extending radially inwardly from said first wall at a distance from the locus of said arc where said spring seats smaller than the coil diameter of said spring.

3. A mold for making a metal-reinforced elastomeric oil seal of the type having a sealing lip with a garter spring molded into the lip body, comprising a plural-element mold, one said element having therein a spring-receiving cavity, said cavity having two radially converging generally axially extending walls meeting at a dead end, said dead end having a groove width smaller than the coil diameter of said spring, and means providing for elastomer flow during mold closure in a direction tending to move said spring deeper into said cavity and into contact with both said walls at a locus spaced from said dead end for continuous full-circle support thereby while confining said spring against any appreciable axial and radial movement during molding.

4. A mold for making a metal-reinforced elastomeric oil seal of the type having a sealing lip with a garter spring molded into the lip body, comprising means providing a mold cavity for shaping said lip body with a spring-receiving and supporting portion of said cavity having a dead end of smaller width than the diameter of the coils of said garter spring and a first radially inner generally axial annular wall providing a sloping flaring surface leading outwardly to said dead end, so that a looped said spring can be placed on said first wall and conformed to a circular shape, a second generally axial wall radially outwardly spaced from said first wall and converging toward it toward said dead end and serving to limit radial outward movement of said spring to prevent substantial stretch during molding, said dead end limiting axially outward movement of said spring, said spring coming to rest against both said walls at a locus spaced from said dead end, and means directing elastomer flow during molding so that it tends to move said spring outwardly toward said dead end during molding.

5. A mold for making annular oil seals of the type having a helical spring molded into an elastomeric body which is bonded to a reinforcing metal ring, said spring having a given overall diameter and a given coil diameter comprising: a plurality of mold members defining a mold cavity, one said mold member having an undercut annular groove communicating with but leading radially outwardly and axially away from the major portion of said mold cavity, said groove being defined by two walls of said mold member that converge as one moves deeper into the groove, the width of said annular groove adjacent said major portion of said mold cavity being greater than the coil diameter of said spring, the overall diameter of an entrance portion of said groove being smaller than the overall diameter of said spring, so that during molding the spring is forced by the elastomer being molded to seat in said groove and is then filled and generally surrounded, except at the points of contact with said groove, with said elastomer, the radial undercut preventing the spring from creeping up out of the groove and preventing circumferential creeping and resulting in a uniformly stressed sealing element.

6. A mold for making annular elastomeric members containing a molded-in annular helical coil spring having a given coil diameter, comprising: a plurality of mold members defining a mold cavity with an annular groove leading radially and axially away from the major portion of said mold cavity, the walls of said groove converging as the groove deepens, the entrance width of said groove being greater than said given coil diameter, a deeper portion of said groove having a width narrower than said given coil diameter so that during molding said spring is forced by the hydraulic pressure of the elastomer being molded to seat against both of said walls but spaced from the bottom of the groove and is filled and generally surrounded, except at the points of contact with said walls, with said elastomer.

7. A mold for making annular elastomeric members of the type having a spring molded therein, comprising: a plurality of mold members defining a mold cavity, one said mold member having an undercut annular groove at a juncture between an axial wall and a radial wall of said cavity, said groove leading radially and axially away from the major portion of said mold cavity and having walls that converge from a distance apart wider than the coil diameter of said spring at said juncture to a distance narrower than said coil diameter, so that said spring is forced against said walls at a uniform stress by the uniform hydraulic pressure of the elastomer being molded.

8. A mold for making annular oil seals of the type having an annular helical coil spring molded into an elastomeric body and backing up an annular lip that is part of said body, said body being bonded to a reinforced metal ring, comprising: a plurality of mold members defining a mold cavity, one said mold member having a generally radial portion on which said ring rests, an axial portion leading from the inner rim of said radial portion to define a web portion of said body, and an undercut annular groove leading from said axial portion radially and axially away from the major portion of said mold cavity and defined by two outwardly converging walls of said mold member and having an entrance portion wider than thte width of the spring coils and a portion where the converging walls are closer together than said width of the spring coils, one said converging wall leading to said axial portion, the other said converging wall having an inner portion defining one side of said seal lip and terminating at a radial shelf, the elastomer being molded forcing the spring to seat against said outwardly converging walls while being filled and surrounded, except at the points of contact with said converging walls, with said elastomer, and being closely adjacent and centered relative to said lip.

9. The mold of claim 8 wherein one said wall lies at an inclination of 35° relative to said mold axis and the other wall lies at an inclination of 45° relative to said mold axis.

References Cited by the Examiner

UNITED STATES PATENTS

| 2,294,589 | 9/1942 | Waterbury | 18—59 |
| 2,321,340 | 6/1943 | Waterbury | 18—42 |
| 3,004,298 | 10/1961 | Haynie | 18—59 |
| 3,095,611 | 7/1963 | Borah | 18—36 |

J. SPENCER OVERHOLSER, *Primary Examiner.*